June 3, 1930.  J. A. REED  1,761,365
FISH NET HOIST
Filed Oct. 13, 1928   2 Sheets-Sheet 2
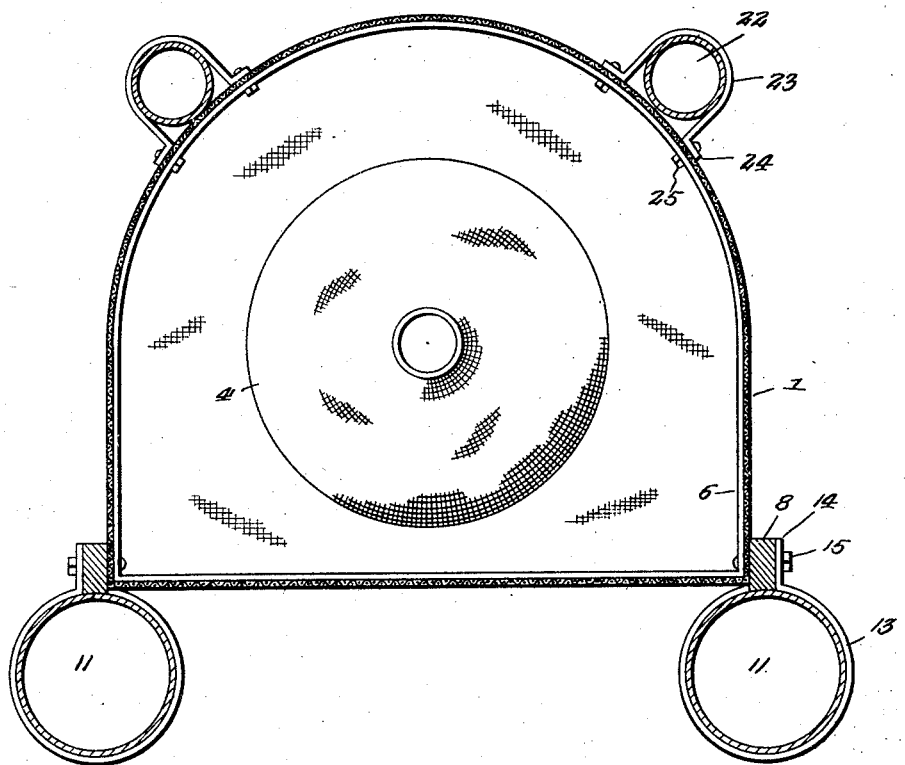
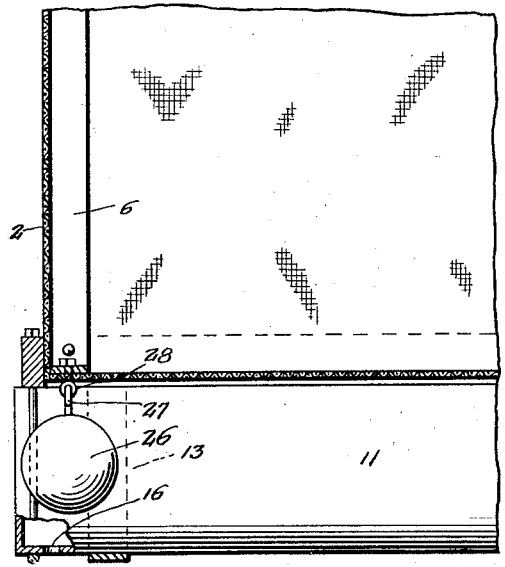
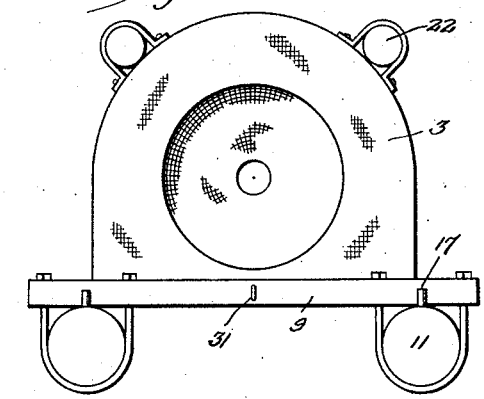

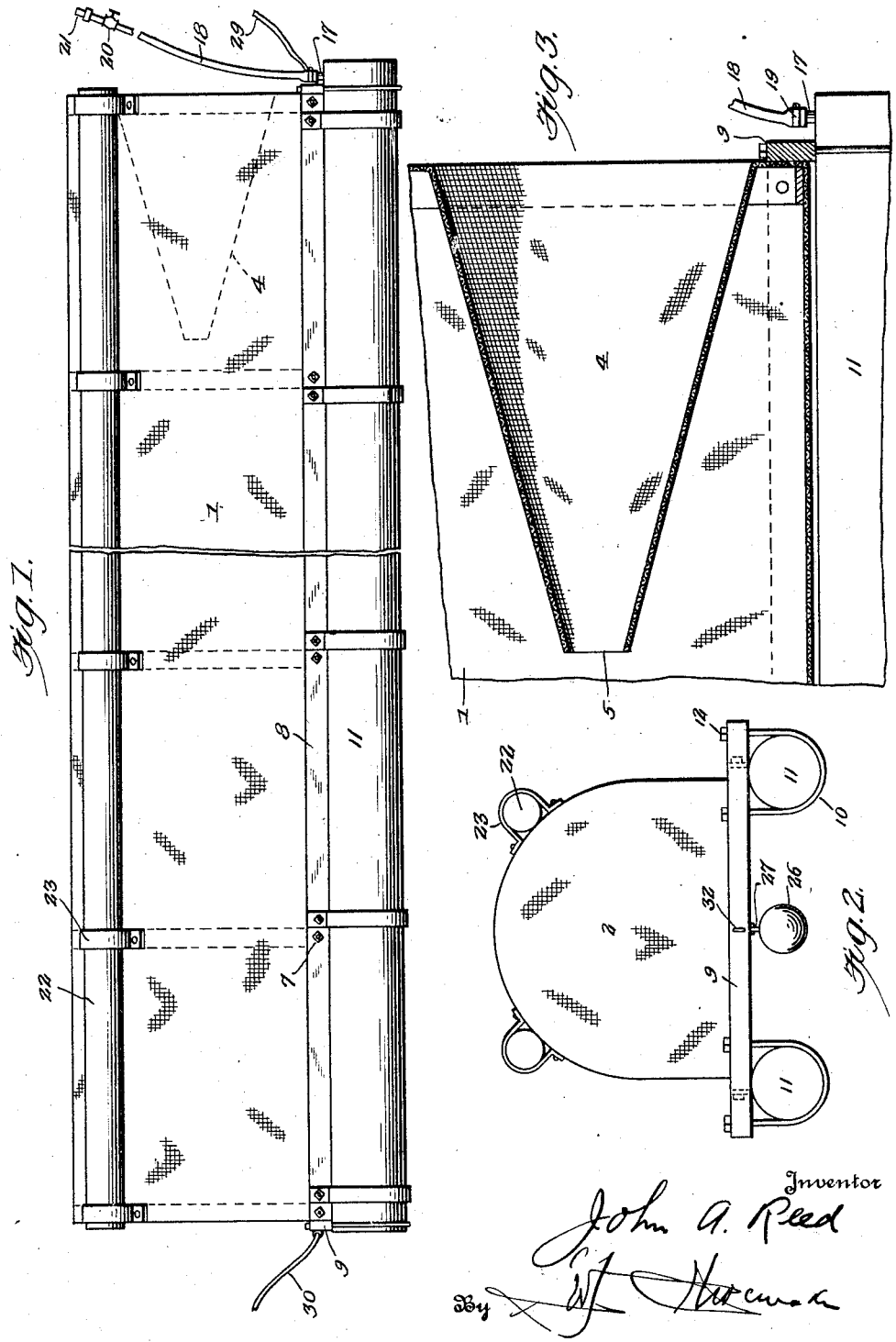

Patented June 3, 1930

1,761,365

UNITED STATES PATENT OFFICE

JOHN A. REED, OF RIDERWOOD, ALABAMA

FISH-NET HOIST

Application filed October 13, 1928. Serial No. 312,344.

The invention relates to a fish net hoist.

The object of the present invention is to provide a simple, practical and efficient device of strong, durable and comparatively inexpensive construction, adapted for raising and lowering in water fish nets or fish traps, and equipped with air containers adapted to raise a fish net or fish trap and float the same at the surface of the water and provided with means for enabling either water or air to be introduced into certain of the air containers for causing the fish net or fish trap to sink in the water to the bottom of a stream and remain on the bottom in a predetermined position and after a period of time to rise to the surface of the water in a predetermined position, whereby the fish net or fish trap may be maintained in an upright position at the bottom of a stream for trapping fish and may be caused to rise to the surface of the water with the inlet for the fish at the top of the net, so that there will be no liability of any of the fish escaping when raising the fish net or trap from the bottom of a stream to the surface of the water.

With these and other objects in view, the invention consists in the construction and novel combination and arrangement of parts hereinafter described, illustrated in the accompanying drawings, and set forth in the claims hereto appended, it being understood that various changes, within the scope of the claims, may be made in the form, size and minor details of construction, without departing from the spirit of the invention or sacrificing any of the advantages thereof.

In the drawings:

Figure 1 is a side elevation of a fish net hoist constructed in accordance with this invention.

Fig. 2 is a rear end elevation of the same.

Fig. 3 is an enlarged detail longitudinal sectional view through the front end of the device.

Fig. 4 is a transverse sectional view through the fish net hoist, looking towards the front end thereof.

Fig. 5 is an enlarged detail sectional view through the rear end of the device.

Fig. 6 is a front end elevation of the device.

In the accompanying drawings, in which is illustrated the preferred embodiment of the invention, 1 designates a fish net body constructed of woven wire or other reticulated material and consisting of a top, bottom, sides and ends, the top being preferably curved or arched as shown, and the bottom being preferably horizontal and the sides vertical and merging into the curved or arched top, but any other desired form of fish net or fish trap body may, of course, be employed, as will be readily understood. The rear end 2 of the body 1 is closed, and the front end 3 is provided with an inwardly tapered inlet 4 which is preferably in the form of a truncated cone having its inner reduced end 5 open to afford access to the interior of the body of the fish net or trap. The body 1 is reinforced and supported by interior hoops 6 conforming to and fitting the inner surface of the top, bottom and sides of the body, and preferably constructed of metal. The hoops 6, which are arranged at intervals, may be of any desired number, and they are secured by bolts 7 or other suitable fastening devices to longitudinal strips 8 located at opposite sides of the body 1 exteriorly thereof, as clearly illustrated in Figs. 1 and 4 of the drawings. The longitudinal side strips or sills are preferably constructed of wood, but they may be made of any suitable material, and they are connected at their ends by cross pieces 9 located at the ends of the body at the bottom thereof, and projecting laterally beyond the sides of the body, as clearly illustrated in Figs. 2 and 6 of the drawings. The cross pieces 9 are suitably secured to the side sills, and they are equipped at their ends with depending U-bolts 10 which secure bottom longitudinal air tanks 11 to the cross pieces. The U-bolts pierce the terminal portions of the cross pieces and are provided at their upper ends with nuts 12.

The air tanks 11 are preferably cylindrical, and are located at opposite sides of the body of the fish net or trap and are arranged centrally beneath the side sills and are secured to the latter by metal collars 13 provided with terminal portions 14 which are secured by bolts 15 to the side sills 8. The bolts 15 pierce the side sills and the sides of the fish net or fish trap body 1. Any number of collars 13 may, of course, be employed, and they are preferably arranged adjacent to the hoops 6, as clearly illustrated in Fig. 1 of the drawings. The bottom longitudinal air tanks 11 are provided with outlets 16 consisting of relatively small port openings and located at the bottom of the air tanks 11 at the rear end thereof, and the said air tanks 11, which are preferably extended slightly in advance of the fish net body, are provided at their front ends at the top with inlets 17 preferably consisting of short nipples to which flexible tubes 18 are secured by clamps 19 or other suitable means. The inlets and outlets may, of course, be of any other preferred construction and may be located at any other desired points, as will be readily understood. The flexible tubes 18, which may be of any desired length, are provided adjacent their free ends with suitable valves 20 and are designed to be provided with suitable couplings 21 to enable them to be connected to an air compressor for forcing air through the tubes into the bottom tanks 11 and expelling water therefrom through the outlets 16. This will convert the tanks 11 into air chambers or floats for raising the fish net body and for causing the same to float at the surface of the water. Also, the valves 20 may be opened and water permitted to flow into the bottom tanks 11 either through the ports 16 or through the flexible tubes, so that the tanks will become filled with water and will cause the fish net to sink to the bottom of a stream. By this operation the fish net or fish trap may be caused either to float at the surface of a body of water, or to sink to the bottom thereof.

In order to assist the raising of the fish net or trap, the body is equipped at the top at opposite sides thereof with relatively small longitudinal air tanks 22, in which air is sealed, and the said air tanks 22, which are preferably cylindrical and constructed of suitable sheet metal, operate as floats or corks to maintain the upper portion of the fish net at the top when lowering the fish net into a stream or other body of water, so that a proper upright position of the fish net within the water will be assured. This will enable the fish net to be lowered to the bottom in proper position, and the fish net will maintain such position in the water at the bottom of the stream until air is introduced into the bottom tanks 11 for raising the fish net. The upper smaller air tanks are secured to the fish net body exteriorly thereof at opposite sides of the top by means of substantially U-shaped clips 23 having their terminal portions 24 extended at an angle in opposite directions and secured to the body 1 by bolts 25 which pierce the hoops 6. The hoops 6, air tanks, and longitudinal and transverse frame pieces 8 and 9, form a frame structure which is rigid and firmly braces and supports the fish net.

In order to cause the front end of the fish net to rise first when the fish net is hoisted or lifted from the bottom of the stream, the body is provided at its rear end with a depending weight 26 which may be in the form of a ball, as clearly shown in Figs. 2 and 5 of the drawing, but which may be of any other desired configuration. The weight 26 is provided with an eye 27 which is linked into an eye 28 of an eye bolt which pierces the bottom of the body and the rear end hoop, as clearly illustrated in Fig. 5 of the drawings. When air is introduced into the bottom air tanks, the water being expelled therefrom, the front portion of the fish net will rise, and the weight will maintain the fish net in a vertical position after the fish net is lifted from the bottom of the stream and is carried upward to the surface of the water. The smaller upper air tanks will assist the lifting and floating of the fish net, but will not interfere with the operation of the relatively large bottom air tanks.

The fish net is provided at its front and rear ends with lines 29 and 30, preferably consisting of ropes secured to suitable eyes 31 and 32 located at the centers of the cross pieces 9, as clearly illustrated in Figs. 2 and 6 of the drawings. The front and rear lines are designed to be attached to a suitable anchorage on the bank of a stream, and in practice the flexible tubes will be connected with the front line so that access may readily be had to the connections by drawing in on the line, and also the front line may be conveniently employed for submerging the flexible tubes after the valves have been opened and it is desired to permit water to enter the bottom tanks. When air is introduced into the bottom air tanks, the fish net will rise and remain floating at the surface of the water until water is again introduced into the bottom tanks, and there will be no liability of the fish escaping from the net while raising the net to the surface of the water. Also there will be no liability of the net turning upside down when being lowered into the water, as the upper air tanks or floats will maintain the net in an upright position.

What is claimed is:

1. A device of the class described, including a fish net body having its front end provided with an inlet opening and the body also being provided at the bottom with tanks and having means for introducing either air or water into the said tanks, whereby the fish net may be caused to rise to the surface of the water or caused to sink to the bottom of a stream, and a weight at the rear end of the body to give inclination to the body and maintain the front end slightly elevated when air is introduced into the tank to raise the body.

2. A device of the class described, including a fish net body, tanks connected with the body at opposite sides of the bottom thereof, and means for introducing either air or water into the tanks for causing the fish net either to float or sink, the front end of the body having a fish inlet opening therein, and means whereby to cause the body to rise in an inclined plane with the inlet opening end of the body slightly elevated when air is introduced into said tanks.

3. A device of the class described, including a fish net body, relatively large tanks arranged at the bottom of the body and provided with means for the introduction of either air or water into the same to cause the fish net to sink or float, and relatively small air tanks connected with the fish net body at the top thereof and assisting the lifting of the fish net body and maintaining the body in a predetermined position.

4. A device of the class described, including a fish net body, relatively large tanks arranged at the bottom of the body and provided with means for the introduction of either air or water into the same to cause the fish net to sink or float, relatively small air tanks connected with the fish net body at the top thereof and assisting the lifting of the fish net body and maintaining the body in a predetermined position, said fish net body being provided at one end with an inlet, and a weight connected with the body at the other end thereof for causing the inlet end of the body to rise first when the body is caused to float.

5. A device of the class described, including a fish net body, hoops arranged within the body and supporting the same, longitudinal sills located at opposite sides of the body and connected with the hoops, cross pieces connecting the sills at the ends of the body, relatively large bottom tanks located beneath the sills and extending longitudinally of the body, and means for securing the tanks to the sills and the cross pieces.

6. A device of the class described, including a fish net body, hoops arranged within the body and supporting the same, longitudinal sills located at opposite sides of the body and connected with the hoops, cross pieces connecting the sills at the ends of the body, relatively large bottom tanks located beneath the sills and extending longitudinally of the body, means for securing the tanks to the sills and the cross pieces, means for introducing either air or water into the bottom tanks, relatively small air tanks located at opposite sides of the body at the top thereof, and means for securing the latter tanks to the body.

7. A device of the class described, including a fish net body, longitudinal sills located at opposite sides of the body, cross pieces connecting the sills, bottom tanks suspended from the fish net body, and means for introducing air or water into the said tanks whereby the fish net body may be caused to rise to the surface of the water or caused to sink to the bottom of a stream.

8. A device of the class described, including a fish net body, longitudinal sills located at opposite sides of the body, cross pieces connecting the sills, bottom tanks suspended from the fish net body, means for introducing air or water into the said tanks whereby the fish net body may be caused to rise to the surface of the water or caused to sink to the bottom of a stream, and sealed air tanks supported on said body above the aforesaid tanks.

9. A device of the class described, including a fish net body, longitudinal sills located at opposite sides of the body, cross pieces connecting the sills, bottom tanks suspended from the fish net body, means for introducing air or water into the said tanks whereby the fish net body may be caused to rise to the surface of the water or caused to sink to the bottom of a stream, sealed air tanks supported on said body above the aforesaid tanks, the fish net body having an inlet opening, and means whereby to maintain the portion of the fish net body having the inlet opening slightly elevated when the fish net body is raised to the surface of the water.

In testimony whereof, I have hereunto set my hand, this 10th day of October, 1928.

JOHN A. REED.